May 14, 1957 C. H. WILLSEY 2,792,040
EGG BREAKING MACHINE
Filed May 16, 1955 6 Sheets-Sheet 1

INVENTOR.
Charles H. Willsey,
BY
Cromwell, Greist + Warden
Attys.

May 14, 1957　　　　C. H. WILLSEY　　　　2,792,040
EGG BREAKING MACHINE
Filed May 16, 1955　　　　　　　　　　　6 Sheets-Sheet 5

INVENTOR.
Charles H. Willsey,
BY
Cromwell, Greist & Warden
Attys.

May 14, 1957 C. H. WILLSEY 2,792,040
EGG BREAKING MACHINE
Filed May 16, 1955 6 Sheets-Sheet 6

INVENTOR.
Charles H. Willsey,
BY
Cromwell, Greist & Warden
ATTYS

United States Patent Office 2,792,040
Patented May 14, 1957

2,792,040

EGG BREAKING MACHINE

Charles H. Willsey, Topeka, Kans.

Application May 16, 1955, Serial No. 508,542

16 Claims. (Cl. 146—2)

This invention relates to egg handling apparatus and is more particularly concerned with improvements in a machine for cracking or breaking successive eggs and for separating the broken shell portions to deliver the contents therefrom to cooperating mechanism for separating the yolks from the whites.

It is a general object of the invention to provide an egg handling machine having an improved mechanism for advancing successive eggs to a cracking station for automatically cracking or breaking the shells of the eggs regardless of their size or shape and for thereafter separating the broken shell portions and delivering the contents by gravity to successive receptacles which are positioned at the cracking station by a cooperating conveyor mechanism.

It is a more specific object of the invention to provide a machine wherein a plurality of eggs are delivered on end to suction cups arranged on a supporting conveyor which grip the eggs at one end and carry them to a cracking station at the end of the conveyor where the other ends of the successive eggs are gripped by cooperating gripper members on a second conveyor, which gripper members have associated therewith cracking knives and cooperating mechanism adapted to move the knives to strike the eggs and penetrate the shells while the eggs are held at both ends at the cracking station, the gripper members on the second conveyor being adapted to hold one of the broken shell portions as the shell portions separate and are moved to inverted position along divergent paths to discharge or dump the egg contents therefrom.

It is another object of the invention to provide in an egg cracking machine an endless conveyor mechanism having a plurality of egg receiving cups thereon, a rotary frame at one end of the conveyor having a plurality of egg gripping members thereon which are arranged to cooperate with the cups on the conveyor mechanism whereby to grasp each egg at opposite ends as the cups on the conveyor mechanism move opposite the rotary frame and into cooperating relation with the gripping members on the latter, in combination with cracking knives pivoted on the rotary frame adjacent the egg gripping members and mechanism for operating the knives to strike and break the shells of successive eggs as they are grasped between the cups and the gripping members whereby the shells are divided into separate portions and the contents are discharged or dumped as the cups on the conveyor mechanism and the gripper members on the rotary frame advance in their respective paths and carry the broken shell portions in opposite directions.

It is a further object of the invention to provide in an egg cracking machine an endless conveyor having a plurality of egg receiving suction cups thereon, a rotary frame mounted at one end of the endless conveyor having a plurality of resilient egg engaging members peripherally spaced thereon and arranged to cooperate with the suction cups on the endless conveyor whereby to grasp each egg at opposite ends as the cups on the conveyor move around the end of the same, in combination with spring loaded cracking knives pivoted on the rotary frame adjacent each of the resilient egg engaging members and mechanism for moving the knives to strike and break the shells of successive eggs as they are grasped by the cups and the resilient engaging members whereby the shells are divided into separate portions and the contents are discharged or dumped as the shell portions advance in their respective paths and move away from each other.

It is another object of the invention to provide in an egg cracking machine a transfer mechanism for delivering a plurality of eggs arranged in row formation from a feed conveyor to a continuously moving cracking conveyor with the eggs being deposited on the cracking conveyor for advancing movement thereby in single file relation.

It is a further object of the invention to provide in an egg cracking machine a rotary frame having a plurality of egg engaging members thereon and a cracking assembly associated with each egg engaging member for cracking the shell of each egg regardless of its size as it reaches a cracking station where separation of the cracked portions of the shell automatically discharges the contents therefrom.

These and other objects and advantages of the invention will be apparent from a consideration of the egg handling machine which is shown by way of illustration in the accompanying drawings, wherein:

Fig. 6 is a section taken on the line 6—6 of Fig. 1, to an enlarged scale and with portions broken away;

Figures 1, 13, 14:
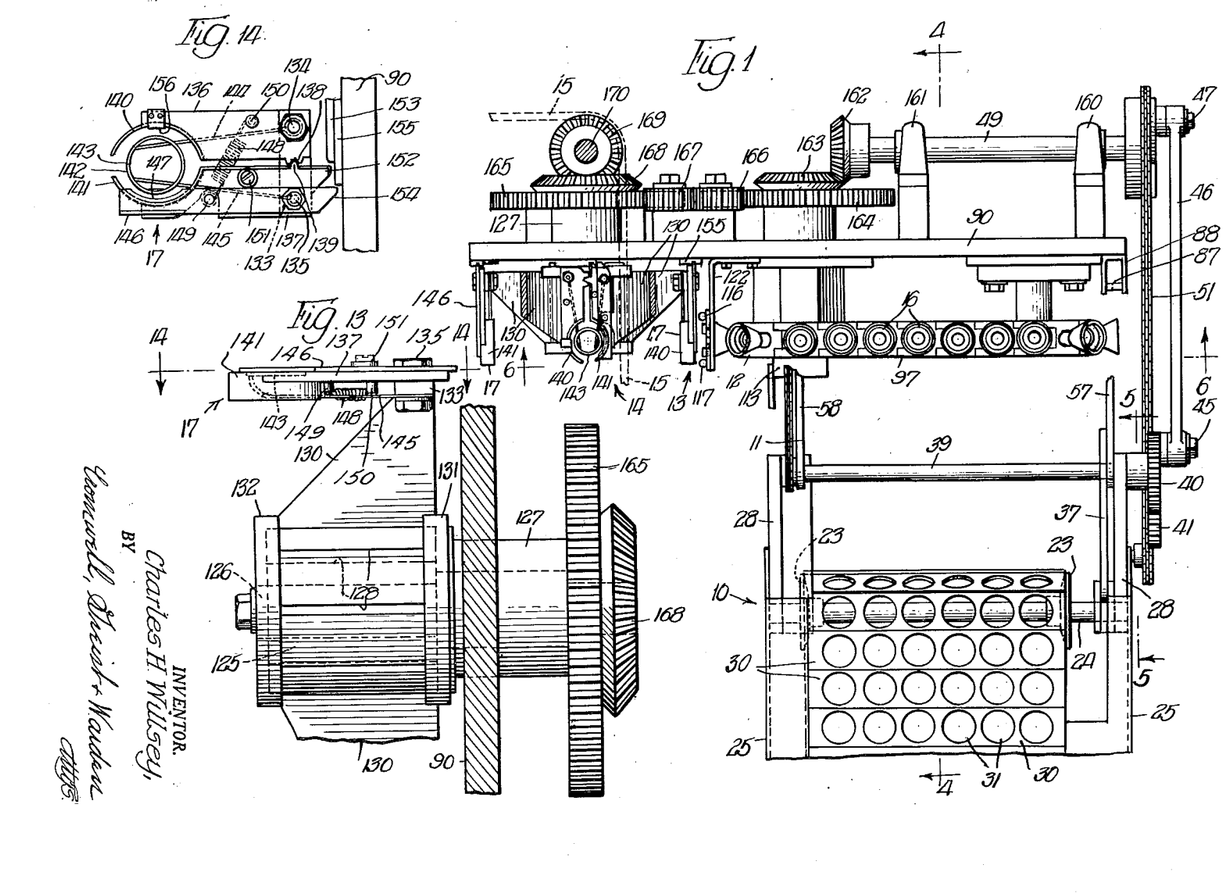
Fig. 1 is a plan view with portions broken away of a machine embodying the principal features of applicant's invention.
Fig. 13 is a section taken on line 13—13 of Fig. 6, to an enlarged scale.
Fig. 14 is a section taken on line 14—14 of Fig. 13, to an enlarged scale.

Referring particularly to Fig. 1 of the drawings the general arrangement and operation of the machine will first be described. It comprises a feed or loading conveyor 10 for supplying eggs in successive row arrangement, a transfer mechanism 11 for delivering successive rows of the eggs to an egg supporting conveyor mechanism 12 which advances the eggs to a cracking station indicated at 13, and a rotary head or turret 14 which carries mechanism for cooperating with the conveyor 12 to hold successive eggs at the cracking station 13 and mechanism for cracking the shells of the eggs so that the contents will be delivered therefrom by the separating movement of the shell portions to successive separating devices which are carried on an endless conveyor 15 in a path extending beneath the cracking station 13.

The loading or feeding conveyor 10 is arranged to move in a horizontal plane to receive the eggs on its upper run. The eggs are positioned on the conveyor 10 either manually or by automatic placing and delivering means (not shown). The conveyor 10 moves the eggs up to a position beneath the transfer mechanism 11 with eggs arranged in rows of six extending transversely of the conveyor. The transfer mechanism 11 picks up successive rows of eggs from the feeding conveyor 10 and moves approximately 180 degrees in a circular path to deliver the rows of eggs to the upper run of the conveyor mechanism 12 which is located in a vertical plane, with the upper run traveling forwardly along the end of the conveyor 10 or toward the left of the operator who is positioned adjacent the cracking station 13 in Fig. 1. The conveyor mechanism 12 receives the eggs with the ends thereof seated in a series of suction cups or holders 16 and advances the eggs in a single line around the leading end thereof to bring each successive egg into a generally horizontal position at the station 13 where the cracking occurs. Each egg is supported at the cracking station 13 with one end in a holding cup 16 on the conveyor 12 and with the other end in a cooperating holding device 17 on the rotary head 14 which is arranged adjacent the leading end of the conveyor 12. While held at the cracking station the successive eggs are broken, or cracked, and as the conveyors 12 and 14 continue their advancing movement the halves of the shells move around beneath the conveyor 12 and the rotary head 14, respectively, and the contents thereof is dumped into a separating device moved into position at station 13 by the separating conveyor 15.

Figures 2, 5, 12:
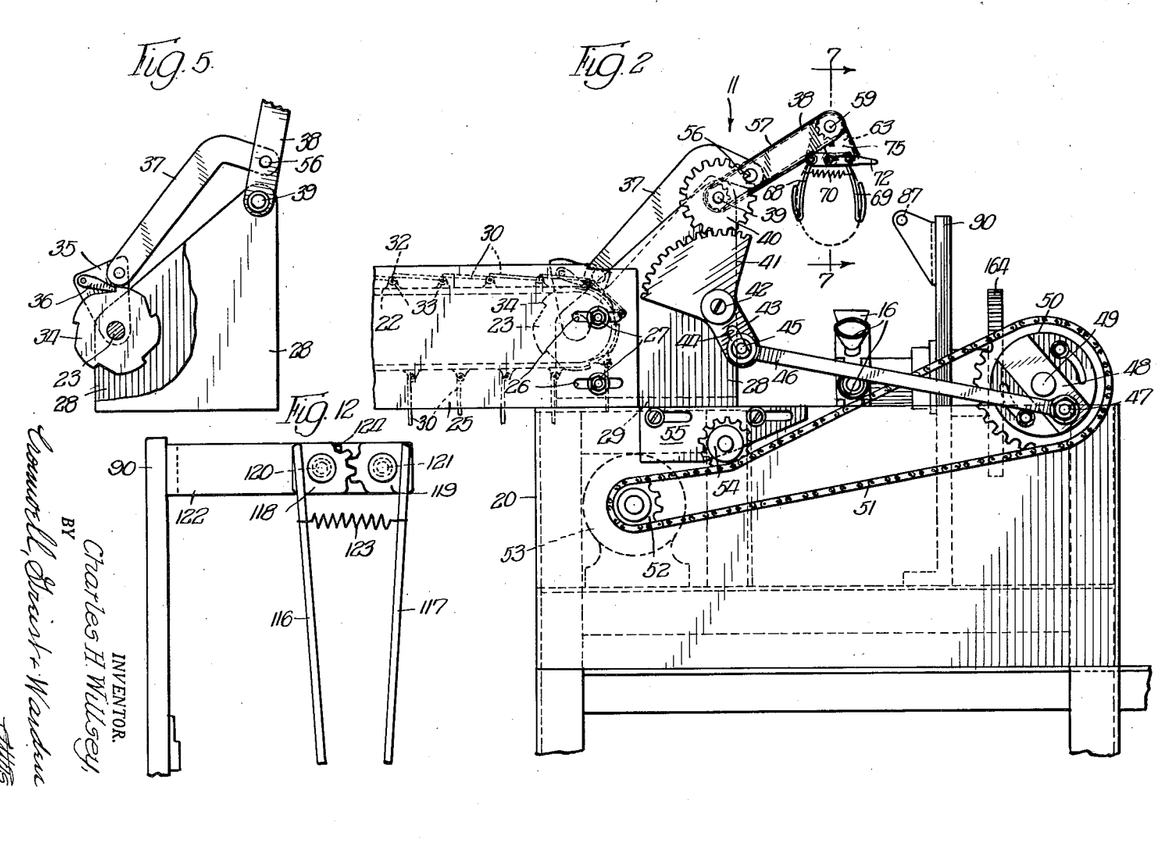
Fig. 2 is an elevation of one side of the machine to an enlarged scale showing particularly the mechanism for delivering the eggs to the cracking conveyor.
Fig. 5 is a fragmentary detail view taken on the line 5—5 of Fig. 1, to an enlarged scale.
Fig. 12 is a section taken on line 12—12 of Fig. 6, to an enlarged scale.
Figure 3:
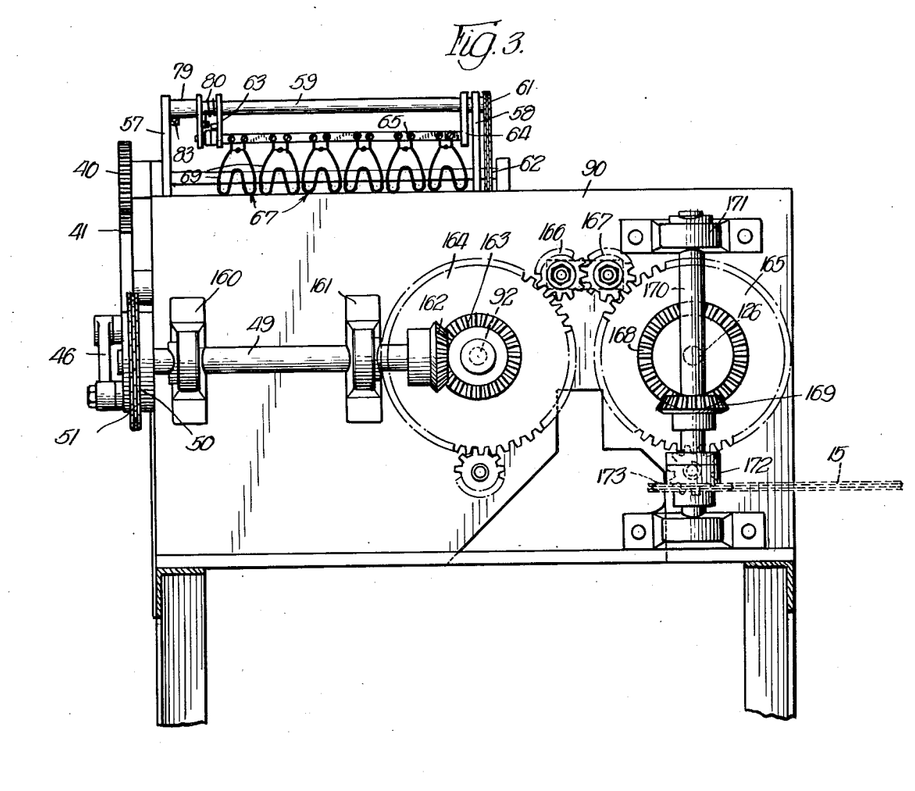
Fig. 3 is an elevation of another side of the machine showing particularly the main portions of the power drive mechanism.

The feed conveyor 10 and the transfer mechanism 11 are arranged at the end of the main frame 20 of the machine. The conveyor 10 comprises laterally spaced endless side chains 22 mounted at one end on sprockets 23, the latter being supported on a cross shaft 24 extending between the ends of longitudinally extending upstanding side support plates 25, the ends of which are supported on the main frame 20 in laterally spaced upstanding relation. The chains 22 are supported on similar sprockets (not shown) arranged at the other end of the conveyor. The upstanding side supporting plates 25 are provided with an end supporting structure (not shown) also at the other end of the conveyor. The side plates 25 are slotted at 26 to receive bolts 27 which secure the same to upstanding support brackets or plates 28 for the transfer mechanism 11, the latter having bottom flanges 29 which are secured to the main frame 20 so that the entire conveyor 10 may be readily disconnected and removed from the machine. The eggs are supported on a series of cross plates 30 each of which is provided with six holes 31, and each of the holes being adapted to support an egg with the long axis arranged in the vertical direction. The cross plates 30 are each pivotally mounted along the forward edge thereof on a cross shaft 32 which is pivotally supported on brackets 33 arranged on the top portions of the links on the side chains 22. The cross shaft 23 at the forward end of the conveyor carries at one end an operating or driving ratchet wheel 34 (Fig. 5). A saddle 35, pivotally mounted on the shaft 23 straddles the ratchet wheel 34 and carries a spring pressed dog 36 which engages the teeth on the ratchet wheel 34. The saddle 35 is oscillated by means of the link 37 which is pivotally connected at one end to the saddle 35 and at the other end to the transfer mechanism in a manner which will be described. At each operation of the transfer mechanism the ratchet 34 is rotated to advance the feed conveyor the distance necessary to position the next row of eggs for the transfer operation.

The egg transfer mechanism 11 comprises a frame 38 which is mounted on the cross shaft 39 at the upper end of the supporting plates 28. The cross shaft 39 extends transversely of the path of the conveyor 10 and at one end has a gear 40 secured thereto which engages with a segmental gear 41 pivoted on the stub shaft 42 and having an extending arm 43 which is slotted at 44 to receive a pin 45 on the end of an operating pitman or link 46. The link 46 has its other end pivoted at 47 to an eccentric 48 which is mounted on the end of a drive shaft 49. The drive shaft 49 carries a gear or sprocket 50 which is connected by a drive chain 51 to the drive pinion or sprocket 52 on a motor drive unit 53 which is adapted to be supported in any conventional manner beneath the frame 20 and which includes conventional speed reduction or control mechanisms. An idler gear 54 is adjustably mounted on the frame 20 by the supporting plate 55 for maintaining tension in the drive chain 51.

Figure 4:
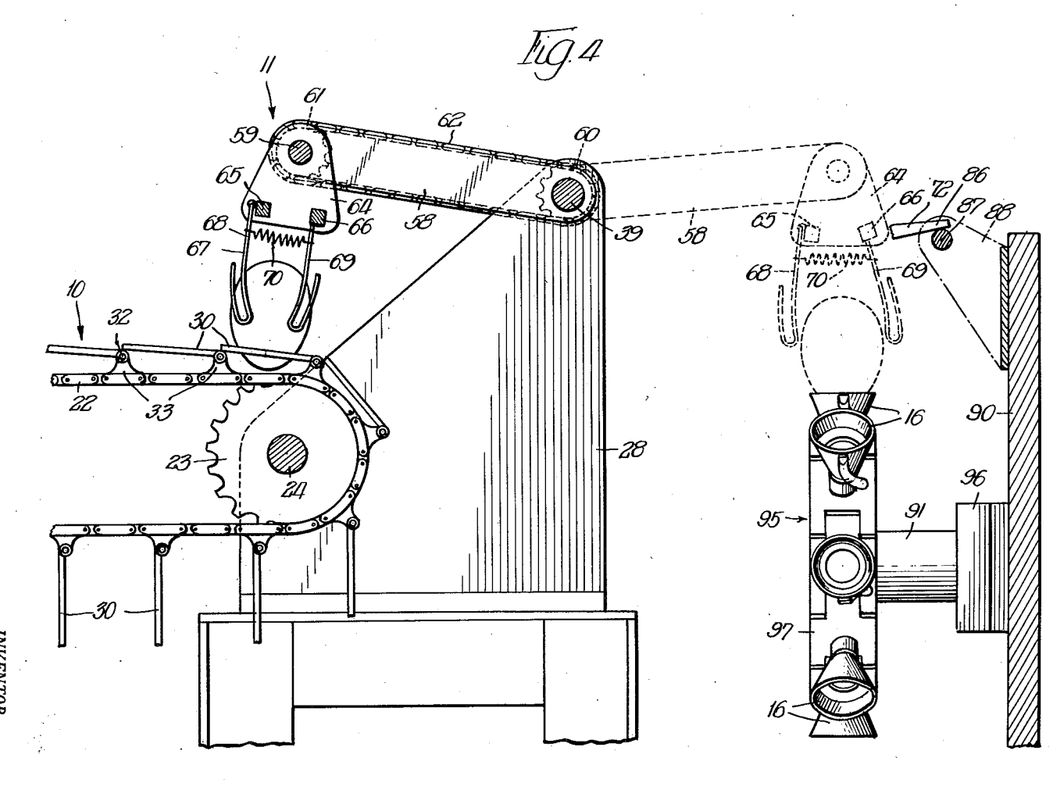
Fig. 4 is a section taken generally on the line 4—4 of Fig. 1, to an enlarged scale.
Figure 7:
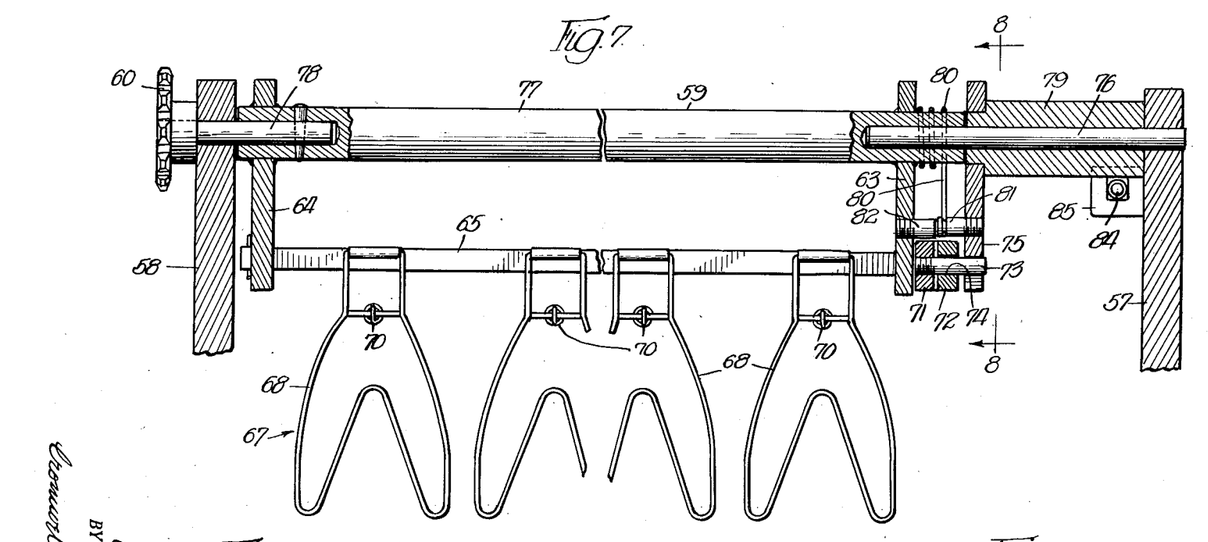
Fig. 7 is a section taken on the line 7—7 of Fig. 2, to an enlarged scale.
Figure 8:
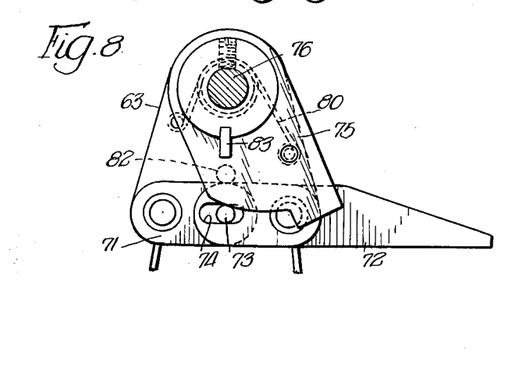
Fig. 8 is a section taken on the line 8—8 of Fig. 7.
Figures 9, 10, 11, 15:
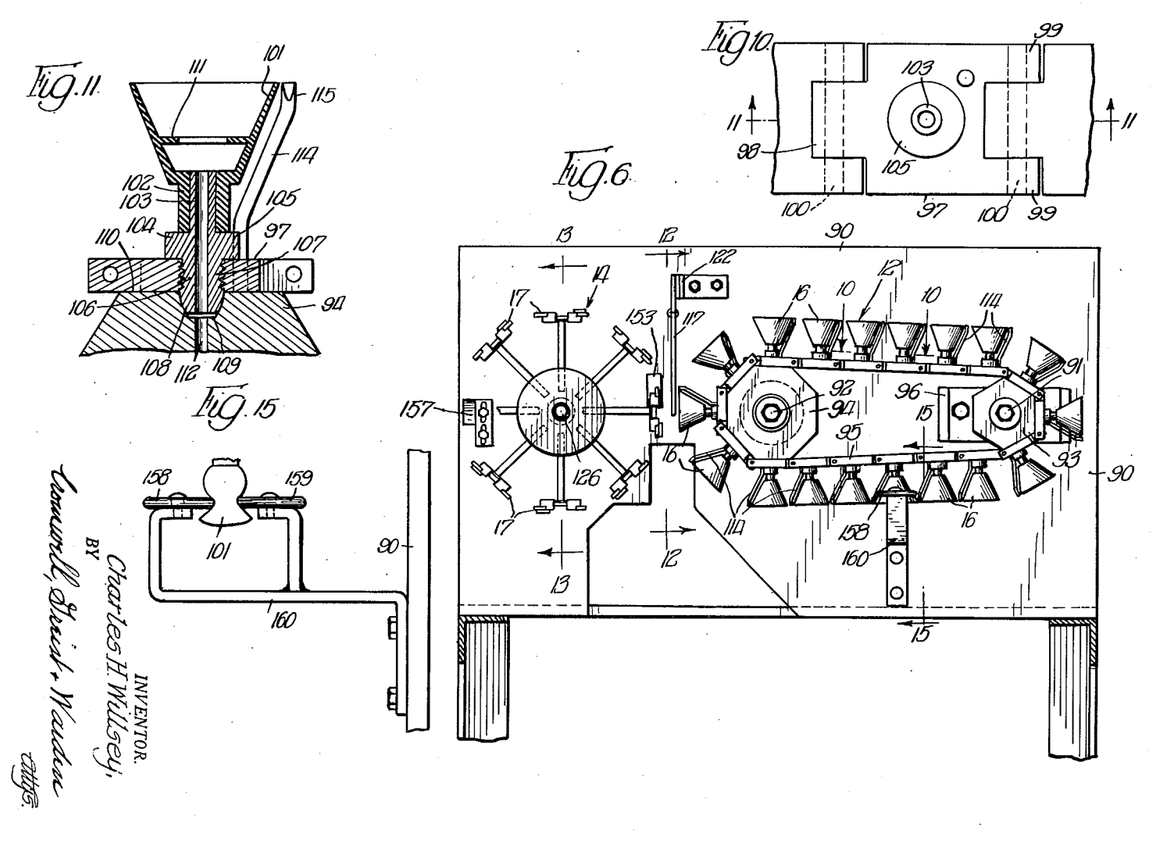
Fig. 9 is a section taken on the same line as Fig. 8 but with the cocking mechanism being released.
Figs. 10 and 11 are detail sections, to an enlarged scale illustrating the conveyor link plates and the egg gripping suction cups carried thereon.
Fig. 15 is a fragmentary section taken on line 15—15 of Fig. 6 to an enlarged scale.
Figure 9:
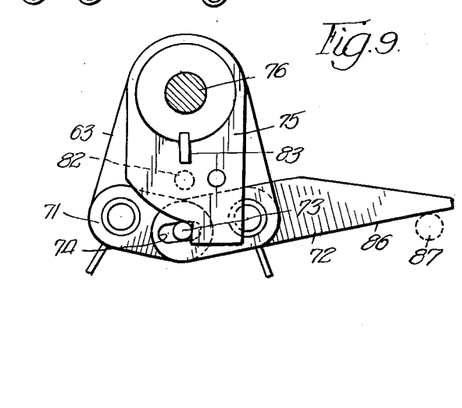

Each rotation of the drive shaft 49 oscillates the rock shaft 39 and the transfer frame 38. The operating arm 37 for the feed conveyor 10 is pivotally connected at its upper end at 56 to a side arm member 57 of the transfer frame 38 and each oscillation of the rock shaft 39 advances the conveyor 10 one step presenting a row of eggs for the next operation of the transfer device. The rock shaft 39 supports the frame 38 which includes the side arms 57 and 58 with the latter being connected at the outer ends by a smaller rock shaft 59. The rock shafts 39 and 59 are provided at corresponding ends with small sprockets 60 and 61 (Fig. 4) which are connected by a chain 62 so that upon oscillating movement of the frame 38 the smaller rock shaft 59 is rotated relative to the outer ends of the side frame members 57 and 58. The rock shaft 59 carries adjacent opposite ends triangular end plates 63 and 64 which are connected along their bottom edges by a pair of cross bars 65 and 66. The cross bars 65 and 66 are rotatably mounted on the plates 63 and 64 and support in depending side-by-side relation six egg gripping assemblies 67. The egg gripping assemblies 67 are adapted to engage and grip successive rows of eggs while they are in transit from the feeding conveyor 10 to the supporting conveyor 12.

Each of the egg gripper assemblies 67 comprises a pair of depending gripper fingers 68 and 69 which are generally U-shaped resilient wire members with the bight portion reversely bent and bowed, as shown, and with the ends of the leg portions connected to the cross bars 65 and 66, the connection between the legs of gripper finger 68 and bar 65 permitting the gripper finger 68 to pivot relative to the bar 65. The gripper fingers 68 and 69 are urged towards each other by a tension spring 70 which is connected between the leg portions thereof adjacent the cross bars 65 and 66. The tension spring 70 urges the gripper fingers 68 and 69 of each of the assemblies towards each other and into a closed position in which they grip the eggs with sufficient force to carry the same from the feed conveyor to the supporting conveyor 12.

The transfer mechanism 11 is provided with mechanism for controlling the opening and closing movements of the gripper assemblies 67 (Figs. 2, 7, 8 and 9). The cross bars 65 and 66 extend at one end beyond the end plate member 63 and have mounted on their extended ends cooperating trip or cocking arm members 71 and 72. The arm member 71 carries a pin 73 which is received in a slot 74 in an overlapping portion of the arm member 72. The pin 73 extends beyond the outer face of the arm member 72 and is adapted to be locked against upward movement, or movement toward the rock shaft 59, by a cam release plate 75 which is rotatably mounted on an end section or pin 76 of the shaft 59. The shaft 59 comprises a main section 77 on which the end plates 63 and 64 are secured in fixed relation and end bearing sections or pins 76 and 78 which extend axially thereof and are journaled in the outer ends of the frame arms 57 and 58 and rotate with the main section 77. The bearing pin 78 has fixed on its outer end the control sprocket 60. The bearing pin 76 at the other end of the shaft 59 carries in rotatable relation thereon the hub portion 79 of the cam release plate 75. A torsion spring 80 surrounds the end of the shaft member 77 in the space between the end plate 63 and the cam release plate 75 with one end tied to the latter by a pin 81 and the other end secured to the end plate 63. The spring 80 urges the plate 75 in the clockwise direction in Fig. 8 into latching position or relation with the projecting end of the pin 73 while the pin 73 is urged in the upward direction by action of springs 70. The upward movement of the overlapping ends of the arms 71 and 72 is limited by a stop pin 82 on the end plate 63. When the latch plate 75 is in the position shown in Fig. 9 the egg gripping assemblies 67 are latched with the gripping fingers 68 and 69 held in open position. When the latch plate 75 is rotated counterclockwise as in Fig. 8 the springs 70 move the fingers 68 and 69 to closed or egg gripping position. The latch plate 75 carries a pin or arm 83 which projects radially of the hub portion 79 and is adapted to be engaged by a stop pin 84 which is adjustably secured in a holder member 85 mounted on the frame arm 58. The stop pin 84 engages the arm 83 on the hub 79 of the latch plate 75 and rotates the latter out of latching position against the action of the spring 80 when the frame 38 is moved to position the gripper assemblies 67 for picking up from the conveyor 10 a line of eggs. As the frame 38 is oscillated to carry the eggs from the conveyor 10 to the conveyor 12 the extending end 86 of the trip member 72 engages with a cam release roller 87 which is mounted on a bracket 88 extending from the vertical supporting or frame plate 90, the conveyor 12 being supported on the front face of the latter. As the arm 72 engages the cam roller 87 and rotates about its axis the pin 73 is pulled downwardly and the bars 65 and 66 carrying the gripper arms 68 and 69 of each of the gripper assemblies 67 are rotated against the action of the springs 70 and move the gripper fingers 68 and 69 to the open position. The plate 75 is held in latching position by the spring 80 as the assemblies 67 rise from the conveyor 12 on their return movement with the gripper fingers 68 and 69 of the assemblies 67 being held in open position. At the completion of the return movement the stop pin 84 engages the arm 83 on the hub 79 of latch plate 75 and moves the latch plate 75 out of latching position to permit the pin 73 to rise due to the action of the connecting springs 70 between the gripper fingers 68 and 69 which permits the fingers to close on the eggs in the conveyor 10. The delivery operation is then repeated.

The vertical frame support plate 90 on which conveyor 12 is supported is generally rectangular in shape and is secured to the base frame 20 in any desired manner. Two spaced shafts 91 and 92 are journaled in the plate 90 and have mounted thereon drum or sprocket formations 93 and 94 which support the endless chain 95 of the conveyor 12. The drum formation 93 which is carried by the shaft 91 forms an idler supporting drum and the shaft 91 is adjustably mounted on the support plate 90 by bracket 96 to provide the proper tension in the conveyor chain 95. The other conveyor supporting drum 94 which is mounted on shaft 92 forms the drive member for the conveyor with the shaft 92 being connected to the power drive for the machine.

The conveyor chain 95 comprises a series of connected link plate members 97 which are adapted to seat on the supporting drums 93 and 94. The drum 93 is hexagonal in section, providing around its periphery six seats for the chain forming members 97, and the drum 94 is octagonal in section, providing on its periphery eight seats for receiving the chain forming members 97.

The conveyor 12 comprises a plurality of chain plates 97 (Figs. 10 and 11) each of which has a central pivot receiving tongue 98 at one edge and a pair of laterally spaced pivot bearing tongues 99 at the opposite edge with adjacent plates being connected in chain formation by pivot pins 100. Each of the link plates 97 carries one of the suction cups 16. Each suction cup 16 comprises a funnel-shaped rubber section 101 and a tubular base section 102 which is mounted on a tubular nipple formation 103 extending outwardly of the plate 97. The tubular nipple 103 is part of a connector member 104 which has a flange or shoulder 105 which seats against the surface of the plate 97 and a threaded stem 106 which engages in a threaded aperture 107 in the plate 97. The stem 106 terminates in a tooth-like end formation 108 which projects from the lower face of the plate 97 and which is adapted to engage or seat in a cooperating socket formation or recess 109 in the face 110 of the conveyor end support member 94. The interengagement of the tooth formations 108 in the socket formations 109 insures positive movement of the conveyor 12 since the action is the same as a chain and sprocket connection between the link forming chain plates 97 and the sprocket forming end support member 94. The cup member 101 is provided with an internal flange or shoulder 111 which, when the cup is positioned on the nipple 103, is in spaced relation to the end of the nipple 103 to prevent damage to the egg which could otherwise occur through engagement of the same with the end of the nipple. Suction is, of course, applied through the passageway internally of the nipple 103 to be effective on the end of an egg positioned in the cup member 101 and to hold the same in the cup. The flange 111 also cooperates with the vacuum pull on the end of the egg to force the shell together in the case of a cracked egg and prevents loss of albumen which would otherwise occur due to the action of the vacuum. The conveyor end support or drum 94 is provided with a vacuum passageway 112 having a radial portion terminating in the socket formation 109 in the center of each face or seat 110 for the conveyor chain plates 97. The tooth formation 108 and the cooperating socket formation 109 are shaped to form a seal between the surfaces thereof while the plate 97 is seated on surface 110 of the drum 94 and the passageway 112 of the latter is connected to a suitable source of vacuum by means of a suction box 113 (Fig. 1) which is mounted at the end of the drum 94. The suction box 113 is provided with a suitable port (not shown) opening on the inner face which engages with the outer face of the drum 94, which port is aligned with the inner opening of the terminals of the passageways 112 for a portion of the movement of the drum 94 around the end of the conveyor. The suction box 113 is connected by suitable connecting members with a source of vacuum (not shown). As each plate 97 passes around the drum 94 suction is applied through the passageway 112 in the drum 94 to the cup member 101 which holds the one end of the egg in position therein. The other end of the egg is supported when it reaches the cracking position by mechanism which will be described subsequently.

Each conveyor chain plate 97 is provided with an upstanding pin 114 which has a curved upper portion 115 positioned closely adjacent the trailing edge of the cup 101 and which steadies the cup and the egg therein as it approaches the cracking station 13 and is centered or guided by a pair of depending guide rods 116 and 117 (Fig. 12). The guide rods 116 and 117 are mounted at their upper ends on gear segments 118 and 119 which are mounted on the pivots 120 and 121 which are provided on a plate-like bracket 122 extending outwardly from the face of the frame support plate 90. The rods are connected by a tension spring 123 adjacent their upper ends and a stop pin 124 is provided to limit their movement relative to each other. The eggs move between the rods, which are resiliently urged toward each other by the spring 123, as they approach the cracking station and are centered for engagement of the free ends by the cooperating gripper mechanisms on the head 14.

As each egg moves around the end of the conveyor mechanism 12 with one end seated in a suction cup 16 thereon the opposite end is engaged by a cooperating holding or gripping mechanism 17 on the rotary head 14. The rotary head mechanism 14 comprises a plate holder 125 which is mounted on a shaft 126 supported in a bearing 127 in the vertical support plate 90. The plate holder 125 is in the form of a cylinder with a plurality of radial slots 128 which are adapted to receive the inner ends of the bracket plates 130 which support the egg holding and cracking assemblies 17. The plates 130 are retained against axial movement by inner and outer circular retainer disks or plates 131 and 132. Each of the bracket plates 130 is generally rectangular in shape with the base secured in a radial slot 128 and with the inner corner having a cross bar member 133 extending laterally of the side faces of the plate 130 and forming a T therewith in which the plate 130 constitutes the stem and the cross bar 133 the head. The cross bar 133 is provided with spaced pivot pins 134 and 135 on which a pair of plates 136 and 137 are mounted. The plates 136 and 137 are pivoted at their inner ends on the pivot pins 134 and 135 for movement in the same plane. Interengaging gear teeth 138 and 139 are provided on the confronting edges of the plates 136 and 137 between the pivots 134 and 135 so that pivotal movement of one of the plates results in a corresponding movement of the other plate. The plate 136 is provided at its outer end with a curved lip or flange 140 which extends from the outer face thereof in a generally radial direction toward the supporting shaft 126. A similar curved lip or flange 141 is provided on the opposed edge of the other plate 137 which cooperates with the lip 140 to form an elliptical size gauging device for engaging with the peripheral surface of an egg. An egg holder or gripper 142 is provided immediately adjacent the plates 136 and 137 which is of resilient wire construction with the wire being bent to form a seating ring 143 and a pair of supporting legs 144 and 145. The ring formation 143 is positioned in the space between the curved flanges 140 and 141. The legs 144 and 145 extend generally parallel with the plates 136 and 137 and are attached at their inner ends to the pivots 134 and 135 so that the cup or spring seat 143 extends in generally concentric relation with the elliptical gripper formed by the flange members 140 and 141 in the position of the same illustrated in Fig. 14. A shell cracking knife 146 is provided on the plate 137 which comprises an elongate relatively narrow plate member having at its outer end a sharpened semicircular cracking edge 147 and being mounted on the pivot 135 at a point spaced from the inner end thereof. A tension spring 148 is provided which has one end secured at 149 on the blade 146 and the other end secured at 150 on the plate 136 which tends to pull the shell cracking edge of the knife towards the plate 136. An upstanding pin 151 is mounted on the plate 137 adjacent the edge of blade 146 and in spaced relation to the pivot 135 which limits the movement of the blade 146 toward the plate 136. The plate 137 is provided at its inner end with an inwardly projecting cam end 152 which extends inwardly of the pivot 135 toward the support plate 90 and is adapted to engage with a cam block 153 mounted on the frame support plate 90 while the knife blade 146 has its inner end extended at 154 for engagement with a cam plate 155 also mounted on the vertical support plate 90. As the knife carrier rotates about the shaft 126 and approaches the cracking station 13 the cam end 152 of the size gauging plate 146 strikes the cam plate 153 and opens up or separates the shell engaging flange members 140 and 141 on the outer ends of the plates 136 and 137. At the same time the extended end 154 on the knife blade 146 engages the cam plate 155 which pivots the same to an open or cocked position against the force of the spring 148. The spring seat 143 engages with the end of an oncoming egg which is carried in one of the cups 16 on the conveyor 12 and which moves into horizontal position between the flange members 140 and 141 which are opened up or separated to permit free movement of the egg. The cam plates 153 and 155 are so arranged or located that at a predetermined time or point in the movement of the assembly 17 the plates 136 and 137 are released to move their outer ends toward each other and cause the flange members 140 and 141 to engage with the egg shell as the end of the egg is seated against the spring member 143. The flange members 140 and 141 act as a size gauging device for the knife blade 146 which is subsequently operated or released by the cam plate 155 and pulled by the spring 148 with a snap movement against the egg shell to cause the cracking edge 147 of the blade 146 to penetrate the shell and crack the same. A relatively small cracking knife member 156 is secured on the flange member 140 with its edge extending into the egg receiving space between the flanges 140 and 141 which serves to penetrate and crack the shell at a point on the opposite side from the knife edge 147. The knife edge 147 strikes the side of the shell which is uppermost when the cracking occurs so that there is little tendency for the knife to penetrate the shell a sufficient distance to cut into the yolk, the latter tending to settle toward the lowermost side of the egg. The small knife 156 is adjusted to penetrate only a slight distance into the shell and merely assists in obtaining relatively uniform breaking of the shells.

As the cracking and holding assembly 17 and the cup 16 move apart in their respective paths the two broken sections of the egg shell are separated and the contents is dumped into a separating device which has been moved into position at the cracking station 13 by the conveyor 15.

The shell section which remains in the cracking assembly 17 after the cracking operation is held by the engagement of the flange members 140 and 141 with the same due to the force exerted by the tension spring 148 until the assembly 17 moves around the lowermost portion of its orbit and is released by engagement of the plate end 152 with a cam plate member located at 157 which separates the plate members 136 and 137, the release of the shell section being insured by the resiliency of the spring gripper or holder member 143. The shell section which is retained in the cup 16 on the conveyor 12 is carried along the lower run of the conveyor 12, if it is not released when the suction is broken by movement of the cup beyond the supporting drum 94, until it reaches a point where the cone-shaped portion 101 of the cup 16 passes between a pair of shell discharging disks or rollers 158 and 159 which are mounted on a supporting bracket 160 extending forwardly of the frame support plate 90. The rollers 158 and 159 are spaced to provide a restricted passageway for the cup member 101 which results in a squeezing action on the cup member to break its hold on the shell.

The shaft 92 for the supporting drum 94 which operates the conveyor 12 and the shaft 126 for the cracking head 14 extend through the frame support plate 90 and are driven by suitable connections from the drive shaft 49. The drive shaft 49 is supported in horizontally extending relation in a pair of bearing brackets 160 and 161 which extend rearwardly of the plate 90. A beveled gear 162 is mounted on the shaft 49 which engages with a beveled gear 163 on the shaft 92 and drives the same. The shaft 92 carries a gear 164 which is connected in driving relation with a similar gear 165 on the shaft 126 by means of a pair of connecting idler pinions 166 and 167. The shaft 126 carries a beveled pinion 168 which drives the pinion 169 on a vertical shaft 170 supported at its upper and lower ends by the bearing brackets 171 and 172 and carrying at its lower end a sprocket 173 for operating the separating conveyor 15.

I claim:

1. An egg handling machine, comprising a continuously operating endless egg carrying conveyor moving in a vertical plane and having a series of gripping members thereon for engaging the ends of eggs positioned thereon, a continuously operating endless holding conveyor moving in a vertical plane and having a series of gripping members thereon for cooperating with the gripping members on the carrying conveyor to position successive eggs between said carrying and holding conveyors with the long axis generally horizontal, size gauging and cracking mechanism mounted with the gripping members on said holding conveyor, and means connected with said last mentioned mechanism to operate the same to break the egg shells when the eggs are positioned horizontally whereby the broken portions thereof are separated as they are advanced by the carrying and holding conveyors and the contents dumped beneath the same.

2. In an egg cracking and separating mechanism, a supporting frame structure, an egg carrying conveyor mounted on said frame structure for operation in a vertical plane, said carrying conveyor having a plurality of pocket forming egg receiving members spaced along the same, a cracking station at the leading end of said carrying conveyor, a holding conveyor mounted on said frame structure for operation in a vertical plane at the leading end of said carrying conveyor and having egg gripping pocket forming members mounted thereon which cooperate with the pocket forming members on the carrying conveyor to support successive eggs therebetween with the long axis of the eggs arranged in generally horizontal position for a predetermined portion of their movement through the cracking station, cracking members mounted with said egg gripping members on said holding conveyor, said cracking members each comprising a pivotally mounted cracking knife having an operating arm extending outwardly of said holding conveyor toward a portion of said frame structure, and cam means positioned on said frame structure adjacent said cracking station and in the path of movement of said operating arm to engage said operating arm and control the movement of said cracking knife whereby to engage and crack the shells of successive eggs while the latter are supported in the horizontal position.

3. In an egg cracking and separating mechanism, an endless egg carrying conveyor having a plurality of pocket forming egg receiving members spaced along the same, a holding conveyor operable in the same plane and at the leading end of said carrying conveyor, said holding conveyor having pocket forming members thereon cooperating with the pocket forming members on the carrying conveyor to support the eggs therebetween with the long axis of the eggs arranged in generally horizontal position for a predetermined portion of their movement, said pocket forming members on said holding conveyor each comprising resilient wire cup formations mounted for resilient movement in a generally radial direction to engage with one end of an egg after the other end is seated in a pocket forming member on the carrying conveyor, size gauging and shell cracking assemblies mounted on said holding conveyor adjacent the pocket forming members thereon, and means connected to said assemblies for operating the same to engage and crack the shells of successive eggs while the latter are supported in the horizontal position.

4. In an egg cracking machine, a conveyor having mounted thereon a series of base plates, each of said base plates having an outwardly opening pocket forming member for engaging an egg at its one end, each of said base plates having an egg cracking assembly mounted thereon for breaking the shell of the egg, said cracking assembly including a movable plate member having a cracking knife pivotally mounted thereon and a cooperating member which is movable therewith to engage the shell of the egg and to position the cracking knife in the vicinity of the middle of the egg, said movable plate member having a stop thereon for limiting the movement of the knife to relatively slight penetration of the shell.

5. In an egg cracking machine, means to support an egg comprising a pair of cooperating gripper members engageable with opposite ends of the egg, a size gauging device pivotally mounted adjacent one of said grippers, means to operate said size gauging device to position the same intermediate the ends of the egg and in the space between the gripper members, a cracking knife movably mounted on said size gauging device, and means to move said cracking knife toward and from the egg in a plane generally transverse to the long axis thereof whereby to pierce the egg shell when the egg is supported between said gripper members.

6. In an egg cracking machine, means to support an egg comprising a rubber-like suction cup, means supporting said cup for movement in a fixed path, said cup being adapted to receive one end of the egg, a resilient spring member having an egg engaging portion, means to support said spring member for movement in an adjoining path, said portion adapted to engage the opposite end of the egg, a cracking device movably mounted adjacent said spring member and having knife supporting means adapted to be moved to a cracking position transversely of the long axis of the egg and intermediate the ends thereof, a cracking knife having a shell piercing edge mounted on said supporting means, said cracking knife being pivotally mounted for movement of said shell piercing edge toward and from the egg in a plane generally transverse to the long axis thereof, means to resiliently urge said knife toward the egg, and means to move said cracking knife to a cocked position and thereafter to release said knife to pierce the egg shell upon movement of said knife supporting means into cracking position relative to the egg.

7. In an egg cracking machine, means to support an egg comprising a pair of cooperating grippers movable into engagement with opposite ends of the egg, a cracking device movably mounted adjacent one of said grippers, said cracking device having a pair of size gauging members adapted to encompass the egg, means to move said size gauging members to position the same intermediate the ends of the egg, a cracking knife pivotally mounted on one of said size gauging members, said cracking knife having a curved shell piercing edge adapted to move toward and from the egg in a plane generally transverse to the long axis thereof, means to position said cracking knife in cocked relation, and to release said knife to pierce the egg shell upon movement of the size gauging members into egg encompassing position.

8. In an egg cracking machine, means to support an egg comprising a pair of cooperating gripper members movable to engage with opposite ends of the egg, a gauging device including a pair of members pivotally mounted adjacent one of said gripper members and adapted to move into encircling relation with the egg intermediate the ends thereof, a shell cracking device including a curved knife blade, said knife blade being mounted on one of said gauging members for pivotal movement toward and from the egg in a plane generally transverse to the long axis thereof, spring means urging said knife blade toward the egg, means for moving said knife blade into a retracted and cocked position while said gripper members are moved into egg supporting position, and means to thereafter release said knife blade for the cracking operation.

9. In an egg cracking machine, a conveyor having mounted thereon for movement in a predetermined closed path a plurality of egg engaging and gripping means, said engaging and gripping means including a base plate and said base plate having mounted thereon an egg cracking assembly consisting of a cracking knife and a size gauging device, said size gauging device being movable into engagement with the egg to adjust the position of the cracking knife for the cracking operation in accordance with the size of the egg.

10. In an egg handling machine, a supporting frame, spaced cooperating egg gripping conveyors mounted on said frame to operate in a common plane, a series of holding devices mounted on the conveyors for gripping opposite ends of successive eggs to move the eggs in a predetermined path between said conveyors and means connected to said conveyors for operating said conveyors to position the egg holding devices thereon in oppositely disposed egg engaging relation, one of said conveyors being adapted to receive eggs in the holding devices thereon, the holding devices on the other conveyor comprising wire ring forming members each being mounted for resilient movement in a generally radial direction to engage with one end of an egg after the other end is seated in a holding device on said first mentioned conveyor, and egg engaging and cracking members mounted on said second mentioned conveyor in radially spaced relation outwardly of the holding devices thereon.

11. In an egg handling apparatus, an endless conveyor supported on a pair of spaced drums, said conveyor having a plurality of egg gripping cups mounted thereon, means cooperating with one of said drums for applying suction to said cups as they pass around said drum, a rotatable frame mounted adjacent said last mentioned drum and having thereon a plurality of egg gripping cups adapted to be moved into cooperating opposed egg gripping relation to the suction cups on said conveyor as the latter pass around said last mentioned drum, means cooperating with said frame for resiliently urging the cups on said frame into gripping relation with the eggs, size gauging members mounted on said frame adjacent each of the cups thereon, each of said size gauging members being movable into encircling relation to an egg gripped between cooperating cups on the conveyor and the frame, and a cracking knife mounted for movement relative to each of said size gauging members to crack the shells of the eggs while they are gripped between said cups.

12. In an egg handling apparatus, an endless conveyor supported on a pair of spaced drums, said conveyor having a plurality of egg gripping cups mounted thereon, means cooperating with one of said drums for applying suction to said cups as they pass around said drum, a rotatable frame mounted adjacent said last mentioned drum and having thereon a plurality of cups adapted to be moved into cooperating opposed egg gripping relation to the suction cups on said conveyor as the latter pass around said last mentioned drum, size gauging devices mounted on said frame adjacent each of the cups on said frame, each of said size gauging devices being movable into encircling relation at a middle portion of an egg gripped between cooperating cups, a cracking knife mounted for movement relative to each of said size gauging devices to crack the shells of the eggs while they are gripped between said cups and permit the shells to be divided into two portions, and release means in the path of movement of each shell portion to release the shell portions from the cups.

13. In an egg handling apparatus, an endless conveyor supported on a pair of spaced drums, said conveyor having a plurality of egg gripping cups mounted thereon, means cooperating with one of said drums for applying suction to said cups as they pass around said drum, a rotatable frame mounted adjacent said last mentioned drum and having mounted thereon a plurality of resilient wire cup formations adapted to be moved into cooperating opposed egg gripping relation to the suction cups on said conveyor as the latter pass around said last mentioned drum, size gauging devices mounted on said frame adjacent each of the wire cups on said frame, each of said size gauging devices having curved flange members movable into encircling relation at a middle portion of an egg gripped between a pair of cooperating cups on the conveyor and the frame, a cracking knife mounted for movement relative to each of said gauging devices to crack the shells of the eggs while they are gripped between said cups and permit the shells to be divided into two portions, and release means in the path of movement of each shell portion to release the shell portions from the cups.

14. In an egg handling apparatus, an endless conveyor supported on a pair of rotatably mounted spaced carrier members, said conveyor having a plurality of egg gripping cups mounted thereon, means cooperating with one of said carrier members for applying suction to said cups as they pass around the same, a rotatable frame mounted adjacent said last mentioned carrier member and having mounted thereon a plurality of resilient wire cup formations adapted to be moved by said frame into cooperating opposed egg gripping relation to the suction cups on said conveyor as the latter pass around said last mentioned carrier member, size gauging devices mounted on said frame adjacent each of the cups on said frame, each of said size gauging devices having opposed flange formations movable into encircling relation at a middle portion of an egg gripped between cooperating cups on the conveyor and frame, a cracking knife mounted for movement relative to one of the flange formations of said gauging devices to crack the shells of the eggs while they are gripped between said cups and encircled by said flange formations whereby to permit the shells to be divided into two portions, and release means in the path of movement of each shell portion to release the shell portions from the cups.

15. In an egg handling apparatus, an endless conveyor mounted on a pair of spaced end supports, said conveyor having a plurality of egg gripping cups mounted thereon, means cooperating with one of said end supports for applying suction to said cups as they pass around the same, a rotatable frame mounted adjacent said last mentioned end support and having resiliently mounted thereon a plurality of cups adapted to be moved into cooperating opposed egg gripping relation to the suction cups on said conveyor as the latter pass around said last mentioned end support, size gauging and shell cracking devices mounted on said frame adjacent each of the cups on said frame, said size gauging and shell cracking devices comprising a pair of pivoted plate members having opposed flanges movable into encircling relation at a middle portion of an egg gripped between cooperating cups on said conveyor and said frame, a cracking knife pivotally mounted on one of said plate members for movement relative to the flange thereon, spring means to pivot said knife to crack the shell of an egg while it is gripped between said cups and encircled by said flanges whereby to permit the shells to be divided into two portions by advancing movement of said cups in divergent paths, and means in the path of movement of each shell portion to release the shell portions from the cups.

16. In an egg handling apparatus, an endless conveyor mounted on a pair of spaced end supports, said conveyor having a plurality of egg gripping cup formations mounted thereon and means cooperating with one of said end supports for applying suction to said cup formations as they pass around the same, a rotatable frame mounted adjacent said last mentioned end support and having thereon a plurality of egg gripping cup formations adapted to be moved by said frame into cooperating opposed egg gripping relation to the cup formations on said conveyor as the latter pass around said last mentioned end support, means cooperating with said frame for resiliently urging the cup formations thereon into gripping relation with the eggs, egg sizing members mounted on said frame adjacent each of the cup formations thereon, each of said egg sizing members having a flange which is movable into engaging relation with an intermediate portion of an egg gripped between cooperating cup formations on the conveyor and the frame, a cracking knife pivotally mounted on one of said egg sizing members, and means for moving said knife relative to said egg sizing member to crack the shell of the egg while it is gripped between said cup formations.

References Cited in the file of this patent

UNITED STATES PATENTS

| | | |
|---|---|---|
| 1,985,320 | Giveen | Dec. 25, 1934 |
| 2,071,859 | Steiner | Feb. 23, 1937 |
| 2,090,963 | Reese | Aug. 24, 1937 |
| 2,314,741 | Sigler | Mar. 23, 1943 |
| 2,536,057 | Hodson et al. | Jan. 2, 1951 |
| 2,575,220 | Hiller | Nov. 13, 1951 |
| 2,655,965 | Gill | Oct. 20, 1953 |
| 2,704,594 | Gorby | Mar. 22, 1955 |